C. P. NORTON.

Cultivators.

No. 5,557.

Reissued August 26, 1873.

WITNESSES.

P. Hannay

D. Gifuart

INVENTOR.

C. P. Norton by A. Wolcott Allen

Atty.

UNITED STATES PATENT OFFICE.

CICERO P. NORTON, OF PRAIRIE CITY, IOWA, ASSIGNOR TO ITHAMAR P. PILLSBURY, OF MONMOUTH, ILLINOIS.

IMPROVEMENT IN CULTIVATORS.

Specification forming part of Letters Patent No. 108,384, dated October 18, 1870; reissue No. 5,557, dated August 26, 1873; application filed July 22, 1873.

*To all whom it may concern:*

Be it known that I, CICERO P. NORTON, of Prairie City, county of Jasper and State of Iowa, have invented certain Improvements in Cultivators, of which the following is a specification:

The nature of my invention relates to improvements in that class of implements generally known as straddle-row cultivators; and the invention consists in so constructing the main frame, and in so connecting the supporting-runners therewith, that either runner may be advanced forward of the other, throwing the transverse bar or bars of the main frame diagonal with the line of progression, while the runners remain parallel with each other and with the said line of progression; the aforesaid construction and arrangement also being such that the vertical and lateral movement of the plow-beams—which are hinged to the main frame in such manner as to allow of their having independent movement, laterally and vertically, of each other—will not, in any way, disturb or interfere with the operations and relative changes of position of the main frame and runners, as hereinbefore set forth.

Figure 1:
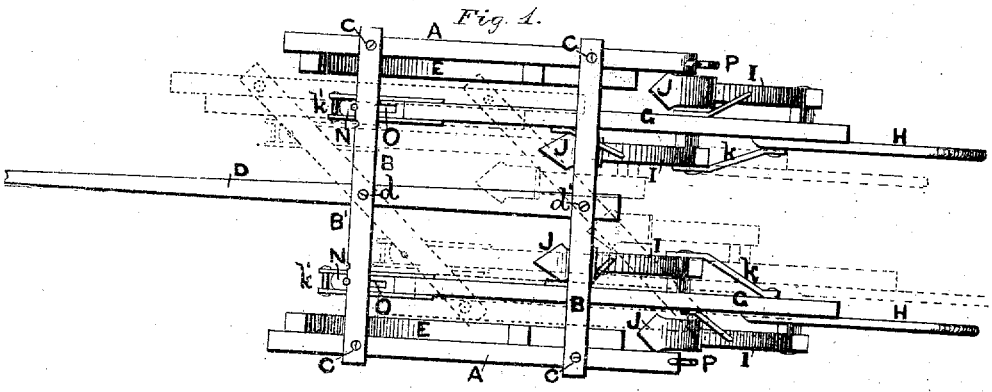
Figure 2:
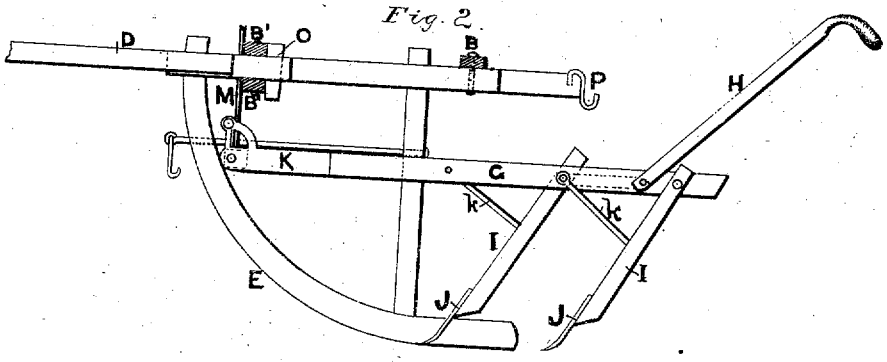
Figure 3:
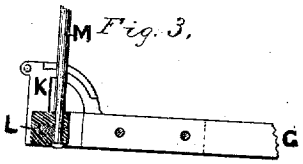
Figure 4:
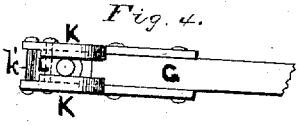

In the accompanying drawing, Figure 1 is a top view of a cultivator embodying my invention. Fig. 2 is a vertical sectional view of Fig. 1. Fig. 3 is a detail sectional view of the forward end of one of the plow-beams; and Fig. 4 is a detail top view of the same.

Referring to the parts by letters, letters A A represent the side bars of the main frame, connected by transverse bars B B′ B′, which are pivoted to the bars A A by bolts C C C C, the bars B′ B′ being placed, the one above, and the other below, the side bars A A. D is the tongue, passing back between the bars B′ B′, to which it is pivoted by a bolt, *d*, and is pivoted, at its rear end, by a bolt, *d′*, to the bar B. E E are the runners, attached to, and supporting, the main frame in an elevated position, as plainly shown in the drawings. G G are the plow-beams, to the rear ends of which are attached handles H H, plow-standards I I I I, plows or shovels J J J J, and braces *k* in the ordinary manner. To the sides of the forward ends of the plow-beams G G are securely bolted the plates K, which are made in the form and manner shown in the drawing—that is to say, upon the upper edges of their forward parts are formed upwardly-projecting parts, which are made thicker than the bodies of the plates K, or have inwardly-projecting flanges formed upon their upper or curved edges, as shown in Figs. 3 and 4. To and between the lower parts of the forward ends of the plates K is pivoted a block, L, by a bolt passing through the said plates and block, as shown in Fig. 3. M M are rods, having heads formed upon their lower ends, which rods pass up vertically through holes in the blocks L. The forward ends of the upwardly-projecting parts of the plates K are connected with a bolt, *k′*, as shown in Figs. 1, 2, 3, and 4, so that they may be drawn toward each other, to bear against the rods M, and to take up the wear.

This construction allows the rear parts of the plow-beams to have a free vertical and lateral movement, and, at the same time, will always hold the plows in a vertical position.

The rods M pass up through the forward ends of the slots in the clasps or blocks N, which are placed and fit between the bars B′ B′, and which are secured in place by the wedge-keys O, driven into the rear ends of the slots in the said blocks at the rear edges of the bars B′ B′. In the forward edges of the bars B′ B′ are formed a number of notches to receive the rods M, so that the said rods may be held securely in place, and, at the same time, kept in a vertical position.

This construction enables the ends of the plow-beams to be readily and quickly raised and lowered, and moved toward and from each other, when required.

To the rear ends of the side bars A A are attached rods P, having hooks formed upon their lower ends, upon which the brace-rods of the plow-standards may be hooked to hold the plows away from the ground when passing from place to place.

The dotted lines at Fig. 1 show plainly the manner in which either side of the main frame may be advanced while the other side is retarded, and either plow-beam oscillated laterally or vertically, while the runners will remain undisturbed in their parallel position with each other and with the line of progression; the advantages of which will be evident to any one skilled in the use of straddle-row cultivators, especially in turning at the ends of rows of plants, and when draft-animals are used which do not pull steadily, and one or the other of which is frequently or continually in advance of the other.

I claim—

The main frame A B, and runners E, arranged, relatively to each other, so that either side of the main frame, together with its runner, may be advanced, and either plow-beam vertically or laterally oscillated, without disturbing the parallelism of the runners with each other or with the line of progression, substantially as described, and for the purpose specified.

CICERO P. NORTON.

Witnesses:
D. G. WINCHELL,
W. G. CLEMENTS.